(12) United States Patent
Avidar et al.

(10) Patent No.: US 11,748,052 B2
(45) Date of Patent: *Sep. 5, 2023

(54) METHOD AND SYSTEM FOR AGGREGATE ASSET ROUTING

(71) Applicant: Lob.com, Inc., San Francisco, CA (US)

(72) Inventors: Leore Avidar, San Francisco, CA (US); Ami Wang, San Francisco, CA (US); Manushika Yapa, San Francisco, CA (US); Andrew Nisbet, San Francisco, CA (US); Boa Khanh Tran, San Francisco, CA (US)

(73) Assignee: Lob.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,521

(22) Filed: Dec. 2, 2021

(65) Prior Publication Data

US 2022/0091806 A1 Mar. 24, 2022

Related U.S. Application Data

(63) Continuation of application No. 17/127,125, filed on Dec. 18, 2020.

(60) Provisional application No. 62/950,680, filed on Dec. 19, 2019.

(51) Int. Cl.
*G06F 3/12* (2006.01)
*G06Q 30/0283* (2023.01)

(52) U.S. Cl.
CPC .......... *G06F 3/1296* (2013.01); *G06F 3/1291* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 6,674,038 B1 | 1/2004 | Latta | |
| 7,778,939 B2 | 8/2010 | Ogg et al. | |
| 8,462,371 B1 | 6/2013 | Uhlig | |
| 9,977,633 B1* | 5/2018 | Khafizova | G06F 3/04883 |
| 10,482,356 B2* | 11/2019 | Tastl | G06F 3/1206 |
| 11,113,657 B2 | 9/2021 | Avidar et al. | |
| 2003/0218770 A1 | 11/2003 | Field | |
| 2004/0207867 A1 | 10/2004 | Stringham | |
| 2009/0055206 A1 | 2/2009 | Orbke | |

(Continued)

FOREIGN PATENT DOCUMENTS

| | | | |
|---|---|---|---|
| JP | 2005050045 A | * | 2/2005 |
| JP | 2013206235 A | | 10/2013 |

OTHER PUBLICATIONS

Chen, Anthony "How We Solve Problems at Lob—Intelligent Mail Through Routing" Lob Blog,https://www.lob.com/blog/how-we-solve-problems-at-lob-intelligent-mail-through-routing, Nov. 9, 2020, 15 pages.

(Continued)

*Primary Examiner* — Fan Zhang
(74) *Attorney, Agent, or Firm* — Jeffrey Schox; Diana Lin

(57) ABSTRACT

A method for asset routing including receiving a digital asset, determining a set of print partners for the digital asset, determining a set of candidate batches for the digital asset, selecting a print partner for the digital asset, optionally determining a print partner for an unmatched digital asset, and routing the digital asset to the print partner.

10 Claims, 8 Drawing Sheets

(56) References Cited

U.S. PATENT DOCUMENTS

| | | | |
|---|---|---|---|
| 2009/0187733 | A1 | 7/2009 | El-Ghazawi |
| 2011/0029429 | A1 | 2/2011 | Whitehouse |
| 2012/0084222 | A1 | 4/2012 | Zimberoff et al. |
| 2013/0054491 | A1 | 2/2013 | Chatow et al. |
| 2013/0129372 | A1* | 5/2013 | Manabe .................. G03G 15/50 |
| | | | 399/82 |
| 2014/0079428 | A1 | 3/2014 | Park et al. |
| 2014/0149308 | A1 | 5/2014 | Ming |
| 2014/0258832 | A1* | 9/2014 | Hepp .................... G06F 40/143 |
| | | | 715/234 |
| 2016/0300250 | A1 | 10/2016 | Rai et al. |
| 2016/0352976 | A1 | 12/2016 | Kuroiwa |
| 2017/0060490 | A1* | 3/2017 | Rajalingam ........... G06F 3/1217 |
| 2018/0240066 | A1 | 8/2018 | Streebin et al. |
| 2019/0311325 | A1 | 10/2019 | Reblin et al. |
| 2020/0234229 | A1 | 7/2020 | Bolha et al. |
| 2020/0278987 | A1 | 9/2020 | Liu et al. |
| 2020/0310725 | A1* | 10/2020 | Fukami .................. G06F 3/121 |

OTHER PUBLICATIONS

Sam Comber, Machine learning innovations in address matching: A practical comparison of word2vec and CRFs (hereafter Comber). (Year: 2019).

Smart Order Routing, "How Do We Route Print Jobs?", https://www.cloudprinter.com/order-routing, Nov. 9, 2020, 9 pages.

"Send Tracker FAQ", https://sendoso.zendesk.com/hc/en-us/articles/360045052631-Send-Tracker-FAQ-Senoso.

Duchene, Patty , https://help.postal.io/en/articles/3727502-reporting-metrics.

\* cited by examiner ruleset

|  | | print partner A | print partner B | print partner C | ... | print partner M | |
|---|---|---|---|---|---|---|---|
| asset parameter permutation 1 | [ | 0.25 | 0.25 | 0.1 | ... | 0.05 | ] |
| asset parameter permutation 2 | [ | 0.5 | 0.1 | 0.0 | ... | 0.2 | ] |
| ⋮ | ⋮ | ⋮ | ⋮ | ⋮ | ... | ⋮ | ⋮ |
| asset parameter permutation N | [ | 0.0 | 0.8 | 0.0 | ... | 0.1 | ] | rule

FIGURE 8

METHOD AND SYSTEM FOR AGGREGATE ASSET ROUTING

CROSS-REFERENCE TO RELATED APPLICATIONS

This application is a continuation of U.S. patent application Ser. No. 17/127,125 filed 18 Dec. 2020, which claims the benefit of US Provisional Application No. 62/950,680 filed 19 Dec. 2019, each of which is incorporated in its entirety by this reference.

TECHNICAL FIELD

This invention relates generally to the delivery services field, and more specifically to a new and useful method for aggregate asset routing.

BRIEF DESCRIPTION OF THE FIGURES

FIG. 8 is a specific example of a rule and a ruleset.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
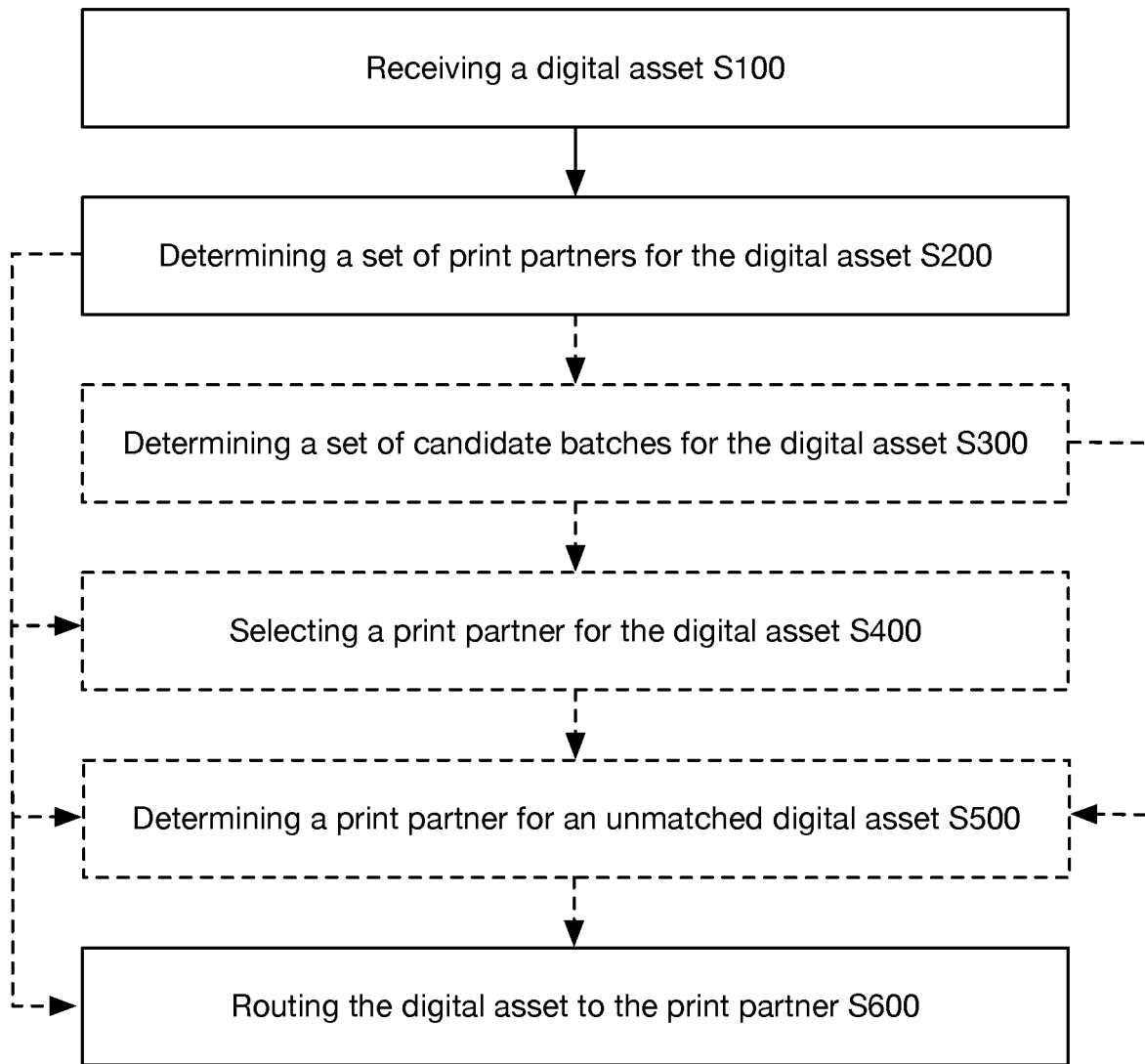
FIG. 1 is a schematic representation of the method.

As shown in FIG. 1, the method for routing a digital asset preferably includes: receiving a digital asset S100; determining a set of print partners for the digital asset S200; optionally determining a set of candidate batches for the digital asset S300; selecting a print partner for the digital asset S400; optionally determining a print partner for an unmatched digital asset S500; routing the digital asset to the print partner S600; and/or any other suitable elements. The method functions to route digital assets to one of a plurality of print partners, each print partner with different capabilities and requirements. However, the digital asset can be otherwise routed or printed. The digital asset is preferably a digital mail piece, but can alternatively be another asset.

Figure 2:
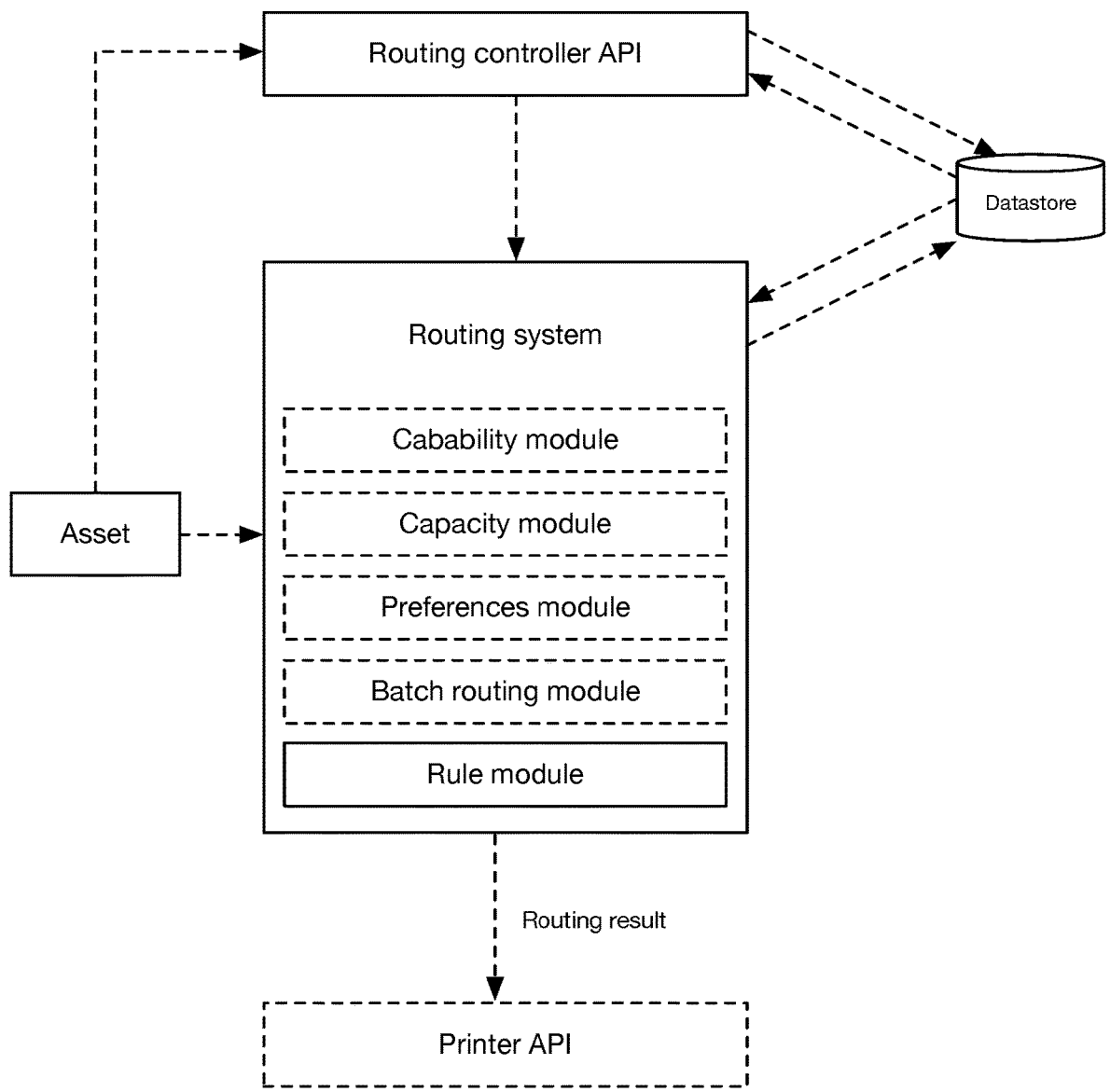
FIG. 2 is a schematic representation of the system.

As shown in FIG. 2, the system 20 for routing a digital asset can include: a computing system; one or more routing systems; one or more routing controller API; and one or more datastores; and/or any other suitable components.

2. EXAMPLES

In a first example, the method for routing an asset to a print partner (e.g., printer) includes: receiving the asset, wherein the asset is associated with asset parameters; determining routing rules, wherein each routing rule is associated with a print partner; automatically determining a set of preferred print partners based on the capability of each print partner and the asset parameters; determining a set of available print partners from the set of capable print partners based on capacity of each print partner of the set of preferred print partners; selecting a print partner for the asset from the set of available print partners based on the rules; and routing the asset to the print partner for printing.

In a second example, generating rules includes automatically generating a rule for an asset parameter permutation, wherein the rules of the rule include weights for each candidate print partner for fulfillment of printing the digital asset (e.g., a higher weight means that the print partner is more likely to be selected to print the digital asset). The rules can be generated using an optimization that minimizes print cost for a monthly volume of digital assets. However, the optimization can be otherwise determined.

3. BENEFITS

The method confers several benefits over conventional systems.

First, variants of the system and method improve asset routing at scale, which suffers from high variability in asset parameters, but low flexibility in print partners' ability to only print various asset parameter permutations; in other words, a print partner is typically able to print certain types of assets, but not others. These challenges render manual, at-scale asset routing impossible. In particular, variants of the technology can automatically route assets at scale in real- or near-real time while respecting each print partner's printing capabilities (e.g., physical capabilities, certifications, etc.), remaining capacity, and daily minimum, each of which can vary on a minute-by-minute basis.

Second, variants of the system and method include selecting a print partner for a digital asset based on rules assigned to each asset parameter permutation. The rules can be determined automatically using an optimization over each print partner's: capability to print the asset; daily capacity, monthly capacity, remaining capacity (e.g., for the day, for the month, etc.); cost for printing the asset; and/or any other suitable criteria.

Third, in conventional print partner service systems, a single print partner is utilized for an entire order, particularly when the order is a bulk asset order. This results in delivery delays, since a single print partner typically does not have the physical capacity or machinery to process multiple large orders in a 1-day or 2-day period on short notice. The method and system enables multiple large orders to be completely processed and received by a delivery service in a short time period (e.g., 1-day period, 2-day period, 3-day period, etc.), using the routing system. The routing system automatically splits an order across one or more print partners to collectively print the entire order within the short time period.

Fourth, variants of the system and method enable disparate assets with vastly different parameters (e.g., customized mail for each recipient) to be received as a unitary order. Processing such individual digital assets can create speed challenges. Print partners print media in batches, where the print partners' machine configuration for each print batch dictates the parameters for the digital assets that can be included in the respective print batch. Since different digital assets in the same order can have different parameters, a print partner may not be able to print an entire order in a single batch, thereby delaying printing and delivery of some of the assets. This is solved by routing mail from a single order to multiple print partners with different print batch machine configurations.

Fifth, print partners provide a set of delivery services with batches of physical assets (e.g., printed mail pieces) to be delivered to recipients. If the batch volume does not meet a threshold defined by the delivery service, then the delivery service will not pick up or deliver the physical assets. This can result in batches being stalled at the print partner for days, until a threshold batch volume is reached. The system and method solves the asset routing problem by selectively routing the assets based on the current batch size for each print partner capable of printing the mail. This solution ensures that batches with a predetermined volume are preferentially generated for each print period. In variants, the digital asset is preferentially routed to a print partner with an existing batch satisfying the asset parameters.

However, the method and system can confer any other suitable benefits.

4. SYSTEM

The method is preferably performed using the system 20 including: a computing system, one or more routing systems, one or more routing controller APIs, one or more datastores, and/or any other suitable components. However, the method can additionally or alternatively be performed using any other suitable system. The system preferably functions to use the asset parameters to assign digital assets to particular print partners, and/or particular print partner batches. However, the system can provide any other suitable function.

The system 20 preferably processes one or more orders from one or more senders. Each order preferably includes one or more digital assets, an associated order volume (e.g., number of digital assets), and one or more timestamps (e.g., time at which the order was received, maximum time allocation for time of order receipt to print, etc.), but can additionally or alternatively include any other suitable information.

Each order can include one or more digital assets. The orders are preferably bulk asset orders (e.g., with at least 100, 200, 500, or more assets), but can alternatively be small asset orders (e.g., 1 or 2 pieces), mid sized asset orders (e.g., 10, 30, 50, 60, 80 assets), or be otherwise sized.

The digital asset can be unique (e.g., each digital asset can have different asset parameters, images, and/or otherwise differ from other assets within the order), but can alternatively be generic or non-unique (e.g., have the same asset parameters, have the same graphics, etc.), or be otherwise related. The assets within an order are preferably addressed to different recipients, but can alternatively be addressed to the same recipient.

The digital asset of an order is preferably a press ready proof (e.g., ready for print), but can additionally or alternatively be proof parameters, the raw constituent components of a proof, or have any other suitable format. The proof can be represented: as a PDF, in HTML, as an image (e.g., PNG, JPG, etc.), and/or any other suitable digital format.

The digital asset is preferably associated with asset parameters (e.g., metadata), which can include: type (e.g., letter, postcard, etc.), color (e.g., black and white, color, etc.), perforation, priority (e.g., first class, standard, etc.), size (e.g., dimensions such as length width, number of sheets, etc.), imagery, mail by date, delivery date, delivery geolocation (e.g., address, zip code, etc.), and/or any other suitable parameter.

Each digital asset can be associated with an asset identifier. The asset identifier can be: globally unique, unique within a batch, temporally unique, nonunique, or otherwise determined. The asset identifier can be associated with: a mail sender, a mail recipient, an order identifier, and/or any other suitable information.

In a first variation, the order is represented as a JSON object that adheres to an API, but can additionally or alternatively be an XML, YAML, plain text, and/or any other suitable data structure. The order can be received as a programmatic function associated with an array. The array can specify different parameter values for each recipient, wherein the system can automatically generate each asset for a given recipient based on the programmatic function and respective values from the array.

However, an order can additionally or alternatively be otherwise defined.

The system 20 can assign a digital asset to a batch associated with a print partner. A batch is preferably a group of assets, different from an order, that can be transferred from a print partner to a delivery service. A batch can include digital assets from a plurality of orders, digital assets from a single order, and/or include any other suitable digital assets. Each batch is preferably associated with a single print partner, but can alternatively be associated with a set of print partners (e.g., wherein the batch is subsequently sent to a print partner within the set for printing). Each print partner can host one or more batches (e.g., concurrently or serially).

A batch can be associated with a minimum volume (e.g., determined by a delivery service, determined by the print partner, and/or otherwise determined). The minimum volume can be of: individual assets, individual digital asset proofs (e.g., a unique asset design), and/or any other suitable asset unit. A batch can be associated with a timeframe (e.g., single business day, span multiple days, etc.). The timeframe can be: a printing timeframe (e.g., the physical assets must be printed within a predetermined timeframe), a mailing timeframe (e.g., the physical assets within the batch must be handed off to the delivery service within a predetermined timeframe), a delivery timeframe (e.g., the physical assets must be delivered to a recipient within a predetermined timeframe), and/or any other suitable timeframe.

A batch can be associated with one or more requirements. Batch requirements can include an asset parameter permutation, such as acceptable parameter values for a given batch (e.g., acceptable parameter values that can be printed together on the print partner machinery). The asset parameter permutation preferably specifies values for a subset of the asset parameters, such that a batch can accept digital assets with different asset parameter values, but can additionally or alternatively specify values for the full set of asset parameters. Batch requirements can be stored in the datastore, and/or otherwise stored. Batch requirements can be specified by each print partner's machinery capabilities, machine setup, manually (e.g., specified by a print partner, by a system administrator, etc.), automatically determined (e.g., specified by a printing machine; determined based on: the type of machines associated with the print partner, the machines' possible configurations, the batch parameters associated with each configuration, the print partner machine setup required to print the digital assets in an existing batch, etc.), and/or otherwise determined. Batch requirements can be received through a graphical user interface (GUI), a print partner machine interface, or any other suitable interface. The GUI is preferably configured to collect batch requirements for the routing system (e.g., information regarding print partners, regarding modules of the routing system, etc.). The batch requirements can be received: over a wired or wireless connection (e.g., the Internet), a CAN or field bus, and/or any other suitable connection.

In a first example, a print partner can create a batch that includes all letters and the batch can be printed at a single machine. In a second example, a print partner can create a first batch including letters of 1-4 sheets and a second batch including letters of 5-6 sheets that can be printed at two separate machines running in parallel. In a third example, a print partner can create a batch with co-mingled perforation (e.g., letters with perforation and letters without perforation in a single batch).

However, a batch can be otherwise defined.

The system 20 can be used with one or more third-party services. The third-party services are preferably operable during production days (e.g., Monday through Friday) and/or any other suitable days of the week. Third party services can include: delivery services, print partners, and/or any other suitable party.

The third-party services can include a delivery service (e.g., USPS, Royal Mail, FedEx, UPS, etc.) that functions to receive and deliver printed assets from one or more print partners. The system preferably interfaces with a plurality of delivery services, but can additionally or alternatively interface with a single delivery service. The delivery service is preferably associated with a set of delivery service parameters, such as minimum batch volume, maximum batch volume, mail batch parameters, pickup times, cost, speed, associated print partners, and/or any other suitable parameter. The delivery service parameters can be: globally applicable, applicable to a route, a geographic region, a timeframe, and/or otherwise limited.

The third-party services can include a print partner that functions to print the individual digital assets. The system preferably interfaces with a plurality of print partners, but can additionally or alternatively interface with a single print partner.

In a first variation, the print partner can receive a digital asset from the routing system and print the digital asset (e.g., for delivery by a delivery service).

In a second variation, the print partner can receive an order from the routing system and print the order. The print partner preferably prints the digital asset in batches (e.g., which can be the same or different from delivery batches specified by the delivery service), but can additionally or alternatively print the mail as one-off pieces, or otherwise print the digital assets. The print partner preferably includes a server that enqueues (e.g., stores) digital assets assigned to the print partner. The print partner can download (e.g., receive one or more digital assets) at a predetermined period (e.g., every 5 min, every 30 min, every hour, etc.).

The print partner can be associated with a set of capabilities (and/or configurations) that limit the types of digital assets that the print partner can print. The set of capabilities can be determined based on the print partner's machinery, be manually specified by the print partner, be determined based on the asset parameters of prior assets printed by the print partner, or be otherwise determined.

Each print partner can have one or more machines (e.g., printer). Each machine can have one or more configurations. Each configuration can have different capabilities. Different print partners can have different machines with different configurability, and therefore be associated with different capability sets. Additionally or alternatively, the set of capabilities can be based on print partner processes or certifications, such as HIPAA certification for handling healthcare mail or security measures for proprietary information, and/or be otherwise determined.

In a first variation, the routing system can transmit instructions to the print partner detailing how to configure a particular machine (e.g., based on batch requirements). The print partner can manually set the machine configuration (e.g., based on a set of batch parameters and/or mail permutations), automatically set the machine configuration (e.g., based on a print partner API interfacing with the routing controller API and the manufacturing machine API, the routing controller API interfacing directly with the manufacturing machine API, etc.), and/or otherwise set the machine configuration.

In a first example, a set of capabilities of a machine can include printing an asset in black and white. In a second example, a set of capabilities of a machine can include printing an asset in black, white, and/or color.

In a second variation, the print partner can inform (e.g., via an API call) the system of print constraints for a given timeframe. For example, the print partner can inform the system of what the print partner is capable of printing for the day, multiple consecutive days, a predetermined day, and/or any suitable day or number thereof. The routing controller API can instruct the routing system to modify the rules and/or create batches based on print-partner-provided constraints.

In a first example, the print partner can determine the machine configuration, which can be communicated to the routing controller API. The assets can then be assigned to a batch (e.g., by the routing system) based on the machine configuration.

In a second example, the print partner can specify the machine configuration and available volume for the day. The system can update the rules based on the machine configuration and the available volume (e.g., include or exclude the print partner in a rule for an asset parameter permutation associated with the machine configuration) and/or adjust the print partner's daily maximum volume.

However, the third-party services can additionally or alternatively include any other suitable elements.

The system 20 preferably includes a computing system, which functions to perform one or more elements of the method. The computing system can be a remote computing system (e.g., server system), a distributed computing system, and/or other computing system. The computing system can execute the routing system and/or portions thereof.

The system 20 preferably includes one or more routing systems. The routing system preferably functions to determine a print partner for a digital asset, but can additionally or alternatively determine a prioritized list (e.g., with weighted priority) of print partners, determine a print partner for an order, and/or provide any other suitable functionality. The routing system is preferably accessible via one or more APIs, but can be otherwise accessible.

The routing system can include one or more rules. In a first example, a rule includes an asset assignment probability or weight for each of a set of print partners. In a second example, a rule is a set of conditions that determine a valid set of print partners (e.g., print partners that satisfy/meet the requirements of the asset parameter permutation associated with the rule).

A condition is preferably a serial combination of expressions. A condition can define a series of expressions, a set of possible print partners, and/or batch requirements. In a first example, when a condition is evaluated, the expressions are preferably implicitly AND'ed together, but can additionally or alternatively be OR'ed, and/or XOR'ed (e.g., depending on the construction of the conditions). If the expressions evaluate to true, then the condition yields the set of partners. If the expressions evaluate to false, then the condition yields no partners. A condition is preferably a JSON object, but can additionally or alternatively be represented as an XML object, YAML object, and/or any other suitable data structure. Examples of conditions include: whether a print partner has the capability to print the asset permutation, whether the print partner will have the machine set up to print the asset permutation for the print time period, whether the print partner has sufficient capacity for the print time period (e.g., day, week, month, etc.), whether a minimum volume for the print partner has been satisfied, whether the print partner is within a predetermined geographic region (e.g., predetermined delivery distance of the recipient address), a predetermined set of asset parameter values, or any other suitable condition.

The rule can include one or more fields. The fields can include: expressions (e.g., a list of expression objects), yields (e.g., a list of partner-weight objects), override (e.g., manual override enabling the output set of print partners from a given module output set to override the capable set of partners, manual override enabling an automatically chosen and/or manually chosen set of print partners to override the capable partners, etc.), and/or any other suitable field.

In a first example, a condition can be defined as follows: if a digital asset is a letter, and the destination state of the digital asset is California, and it is one sheet, and a rule can be defined as follows: send to Partner A 75% of the time, and Partner B 25% of the time. Specifically, the rule weights Partner A 75% and Partner B 25%.

However, the rule can additionally or alternatively include any other suitable elements and/or be otherwise configured.

The routing system can include one or more system parameters. A system parameter is preferably a JSON object, but can additionally or alternatively be represented as an XML object, YAML object, and/or any other suitable data structure. A system parameter can be adjustable or not adjustable. A system parameter can be determined by a print partner (e.g., received by the routing controller API from the print partner API, received directly from a print partner GUI, and/or otherwise received), service provider, and/or a user. A system parameter can specify: adding and/or removing print partners, setting the operational state of the routing system (e.g., based on digital asset permutation), setting the partner priority (e.g., based on digital asset permutation, threshold volumes such as determined by the delivery service; target volumes such as determined by the print partner, etc.), manual override conditions, counts (e.g., stored in the datastore), routing preferences (e.g., bypass routing system and manually and/or automatically re-route the digital asset), and/or specify any other suitable information.

However, the system parameters can additionally or alternatively include any other suitable elements and/or be otherwise defined.

The routing system preferably includes one or more modules. The modules can include any number of the following modules, arranged in any other suitable order. The modules can include: a capability module, batch module, preferences module, capacity module, print estimation module, cost optimization module, rule module, state determination module, and/or any other suitable module.

The modules can include a capability module, which can function to identify a capable partner set (e.g., set of print partners capable of printing the digital asset). The capability module can identify a set of print partners based on the asset parameter permutations of the batches associated with print partners and/or the asset parameter permutations associated with the print partner capabilities. The asset parameter permutations can be retrieved by querying the datastore, querying the print partner API, and/or be otherwise retrieved.

However, the capability module can be otherwise configured.

The modules can include a batch module, which can function to route a digital asset to a batch (e.g., existing, new, etc.), but can additionally or alternatively provide any other suitable set of functionalities.

The batching module can select a batch for a digital asset based on: a predetermined batch threshold volume (e.g., minimum, maximum, etc.), the batching timeframe (e.g., timeframe between mail pickups), an asset parameter permutation (e.g., asset permutation parameter values that can be included in the batch), batch criteria, and/or any other suitable condition. The batching criteria can be specified for a period of time (e.g., production/operational day, month, etc.). The batching criteria can be specified for a batch, for a print partner (e.g., capable of filling multiple batches), and/or otherwise specified. The batching criteria can include criteria specifying a predetermined print partner threshold volume (e.g., minimum, maximum, etc.) for the total volume of digital assets across all batches filled by the print partner (e.g., per day, per month, etc.), and/or any other suitable condition.

The batch module can determine whether asset parameters satisfy any of the (existing) batches (e.g., specified by batch requirements), but can additionally or alternatively include matching batch requirements with the asset parameters. The (existing) batches can include batches that pre-exist at respective print partners (e.g., from prior orders from the system, from other customers of the print partner, etc.), but the batches can additionally or alternatively be scheduled to start at a pre-determined time, and/or capable of starting at a particular machine (not yet existing).

The batch module can be part of, be separate from, and/or receive candidate print partners from the cost optimization module, the capability module and/or any other suitable module.

However, the batch module be otherwise configured.

The modules can include a preference module, which can function to determine a preferred partner set based on system preferences for different print partners. The preferred partner set can be selected based on: manual override conditions (e.g., account identifiers associated with batch requirements, account identifiers associated with specific print partners, etc.), the rule associated with the asset's parameters and/or any other suitable information. The account identifiers are preferably associated with respective senders, but can additionally or alternatively be associated with respective service providers, and/or otherwise associated. The print partners of a rule can be prioritized based on the weight associated with each print partner, and/or otherwise prioritized or not prioritized. In a first specific example, the rule can be: postcards for a specific account identifier are sent to print partner A. In a second specific example, the rule can be: all letters are sent to print partner B.

The preference module can be part of, separate from, and/or receive candidate partners from the batch module, the capacity module, and/or any other suitable module.

In variants, the preferred partner set can be based on the routing system state (e.g., cost, speed, high-volume, etc.) determined by the state determination module.

However, the preference module can be otherwise configured.

The modules can include a capacity module, which can function to determine an available print partner set. The capacity module can identify each print partner's: remaining capacity (e.g., for the day, for the month, etc.), minimum volume satisfaction (e.g., for a day, for a month, etc.), and/or any other information to determine whether the print partner has capacity to print the digital asset. The capacity module can be asset parameter agnostic and/or based on the asset parameters. The capacity module can assess capacities per print partner over a production period (e.g., production/operational day, multiple days, 12 pm PDT, etc.).

In a first variant, if a print partner has remaining capacity and the minimum volume is not satisfied, the print partner can be included in the available partner set.

In a second variant, if a print partner has remaining capacity and the minimum volume is satisfied, then the print partner can be included or not included in the available print partner set.

In a third variation, if a print partner does not have remaining capacity, then the print partner is not included in the available print partner set.

In variants, if a given print partner is over capacity for a first production day, the capacity module can reduce the next production day by the amount the first production day is over capacity, cancel the digital asset and route the digital asset to the fail queue, re-route the digital asset to the next best print partner (e.g., based on a rule for the asset parameter permutation), change the print partner's weight in the rule, enqueue to a specific print partner queue, and/or any other action.

In a first example, if a print partner is over capacity, the capacity module will not include the print partner in the available partner set.

In variants, re-routing can occur automatically and/or manually when print partners need to send back digital asset(s) (e.g., to the routing system) that were unable to fulfilled. The digital asset can be routed to the routing system (e.g., via the fail queue, via the mail queue, directly to the routing system, etc.), wherein the asset parameters can be updated. Additionally or alternatively, the rule and/or ruleset can be updated and/or a print partner batch can be automatically and/or manually selected.

The capacity module can reset the capacity associated with each print partner in the datastore after a production period termination, set new capacities, and/or the otherwise update print partner capacities. The capacity module can increment the capacity volume and/or decrement the capacity volume of each print partner in the datastore.

However, the capacity module can be otherwise configured.

The modules can include a print estimation module (e.g., production day module, production hour module, etc.), which can function to estimate when the digital asset will be printed (e.g., print day), estimate the volume of mail with a predetermined asset parameter permutation, estimate when the physical asset will be delivered, and/or provide any other functionality.

Estimating when the digital asset will be printed can include estimating which production period (e.g., day, week, etc.) the digital asset will belong to (e.g., for a given print partner). Estimating the print day can be based on time of delivery (e.g., digital asset delivery to print partner), current backlog for the print partner, current machine configuration, estimated machine reconfiguration time (e.g., to print the digital asset), print partner history (e.g., historic print duration for all mail, for the print permutation, etc.), print partner production day definition (e.g., hours of operation), and/or otherwise any other suitable information.

In a specific example, estimating when the digital asset will be printed and mailed can include determining a start time stamp (e.g., start-the-clock date), such as the timestamp when the digital asset is enqueued at the mail queue, when the digital asset enters the routing system, when the digital asset is routed to the print partner queue, and/or any other suitable time.

Estimating the volume of digital assets with a predetermined asset parameter permutation can be determined based previous batches with the same and/or similar asset parameter permutations, the volumes of the identified batches, and/or any other suitable information.

Estimating when the physical asset will be delivered can be determined based on delivery service pickup time, historical delivery speeds, and/or any other suitable information.

The print estimation module can be used by the capacity module, the batch module, and/or any other suitable module. However, the print estimation module can be otherwise configured.

The modules can include a cost optimization module, which can function to prioritize print partners based on cost. The cost is preferably the cost to print and deliver the asset, but can additionally or alternatively be the cost to print the asset, the cost to deliver the asset, the estimated cost to delivery delay, and/or any other suitable cost. The cost optimization module can include a cost optimization criteria which can include conditions defined by a proximity metric. The proximity metric can be the proximity to the next highest volume tier (threshold) that gives the next best unit economic (price) per print partner (e.g., to lower the cost of printing digital assets at a particular print partner).

In a first example, the cost optimization module can include conditions that identify the best print partner to assign a digital asset, based on the print partner who can produce that piece the cheapest due to paper costs, operating costs, postage saturation for that zip code, and/or due to any other suitable cost reduction.

The cost optimization module can be used by the batch module, the preference module, used by any other suitable module, and/or used as a separate module.

However, the cost optimization module can be otherwise configured.

The modules can include a rule module, which functions to determine one or more rules per asset parameter permutation. Each rule can pair a particular asset parameter permutation with a set of potential print partners. Each rule can specify a decision tree, a filtering threshold, set of weights or preferences for each potential partner within the set, an equation to calculate the print partner weights, and/or be otherwise constructed. The rules can be generated based on: routable print partners; print partner cost (e.g., for the asset parameter permutation); daily capacity of print partners; print partners with available capacity; print partners with remaining capacity for a timeframe (e.g., day, week, month); operation days; manual preferences (e.g., peak volume, manual volume, etc.); partner capabilities (e.g., physical capabilities to print a certain mail type, certifications, etc.); minimum timeframe (e.g., day, week, month, etc.); historical data; price data (e.g., per print partner, per mail parameter, per mail parameter permutation, etc.); estimated volume (e.g., for all mail; for specific asset parameter permutations; for specific user accounts; for a given timeframe, such as the rest of an hour, next hour, Nth hour, rest of day, next day, Nth day, rest of week, next week, Nth week, rest of month, next month, Nth month, rest of year, next year, Nth year, etc.; etc.); geography; geographic concentration (e.g., of mail, of a user population, etc.); region saturation; and/or determined based on other factors and parameters. The rules can be generated automatically (e.g., iteratively; based on an optimization; randomly; etc.), manually, and/or otherwise generated.

However, the rule module can be otherwise configured.

The modules can include a state determination module, which can function to determine (e.g. monitor, estimate, etc.) the routing system state. More preferably, the state determination module can determine the digital asset volume and/or order volume through the system at a given time and/or over a time period (e.g., 1 minute, 5 minutes, etc.). The state determination module can be used by and/or be a part of the preference module, the batch module, and/or any other suitable module and/or used as a separate module. The state determination module can: classify, calculate, select, or otherwise determine the routing system state. The routing system state is preferably determined based on the volume and/or rate of digital assets routed through the system, but can additionally or alternatively be determined based on the number of orders, the number of assets within each order, the number of orders in a given queue, and/or any other suitable information.

The routing system can be operable between one or more states: stable, high-volume, and/or any other suitable state. The state can be automatically determined, manually determined, and/or otherwise determined. Each state can be associated with system parameter value ranges and/or any other suitable data.

The stable state can be determined when the system parameters are in a predetermined range. The system parameters can include volume, speed, distributions, and/or any other suitable parameter. The volume parameter can include volume thresholds (e.g., volumes are within 50% of the average for a given batch, for a given set of asset parameters, etc.), such as for print partners, for asset types (e.g., letters, postcards, etc.) and/or for any other asset permutation parameter. The stable criteria can include conditions specifying a speed metric (e.g., metric to measure the speed that a mail piece is routed to a print partner). The stable criteria can include conditions based on a distribution of weights assigned to print partners (e.g., primary, secondary, tertiary, etc.) and/or a distribution of weights assigned to batches. In a first example, 75% of the monthly digital asset volumes can go to the primary partner and 25% of the monthly digital asset volume can go to secondary partner. However, the stable state can additionally or alternatively include any other suitable elements and/or be otherwise defined.

The high-volume state can be determined when the system parameters are indicative of high volumes (e.g., volumes are greater than 50% of the average for a given batch, for a given set of asset parameters, for a given time period, etc.). When the system is in a high-volume state, the system can re-route digital assets due to delays from capacity constraints of print partners, throughput constraints (e.g., print partner machine malfunction, etc.), and/or otherwise re-routing digital assets. The high-volume criteria can include conditions specifying a fail metric (e.g., the number of unrouted and/or failed digital assets, the number of orphaned digital assets, etc.). The fail metric can be used to measure the performance of the routing system.

In a specific example, when the volume of 6×9 postcards is greater than 50% of the average for a batch, the system is determined to be in a high-volume state.

The state determination module can be part of and/or used by the batch module, the preference module, can be separate, and/or used by any other suitable module.

However, the modules can be otherwise configured.

The system 20 preferably includes a routing controller API that functions to coordinate routing system activities and/or interface the routing system components. The routing controller API preferably interfaces with the print partner API and the routing system, but can additionally or alternatively interface with a graphical user interface (e.g., presented to the sender), and/or interface with any other suitable party. The routing controller API preferably accesses/queries the datastore. The routing controller API can update the ruleset in the datastore. The routing controller API can transmit ruleset to one or more modules of the routing system (e.g., periodically, such as for every digital asset, every 10 assets, every digital asset, every 5 minutes, every hour, etc.; after a rule and/or ruleset update; and/or at any other suitable time). The routing controller API can additionally or alternatively communicate volume parameters and/or thresholds to one or more modules of the routing system. The routing controller API can receive failed digital assets from the fail queue, orphaned digital assets from the orphan queue, and/or receive any other suitable digital assets. The routing controller API can transmit received digital assets to the mail queue, directly to the routing system, to a different system capable of determining a batch associated with a print partner for the specified digital asset, and/or otherwise transmit the digital asset.

However, the routing controller API can be otherwise configured.

The system 20 preferably includes one or more datastores. The datastore is preferably queryable. The datastores can include one or more: module datastores, capacity datastores, queues, print partner databases, and/or any other suitable datastore. The data stored in the datastores can be determined automatically (e.g., via print partner APIs, manufacturing machine APIs, the routing controller API, the GUI, etc.), manually (e.g., by a service administrator), and/or otherwise determined.

The datastore can store information per print partner (e.g., machine capabilities, counters, etc.) and/or any other suitable information. The information per print partner can include: currently available capacity per print partner, such as one or more counters (e.g., for one or more time periods, batch counters per print period such as the number of digital assets in a batch in a given production period; monthly volume counters such as the number of digital assets and/or orders sent to the print partner in a given month, etc.); capability per print partner (e.g., print permutations that each print partner can print, based on all print partner machinery, the batch parameters, etc.); one or more weight parameters: per print partner (e.g., weight priority based on a volume target, volume threshold, etc.), per batch (e.g., weight priority based on a batch volume target, and/or batch volume threshold); and/or any other suitable information. The weight parameter can be determined automatically (e.g., by the routing controller API) and/or manually (e.g., by a service provider). The weight parameter can be based on capacity, existing/open batch size(s), monthly quota associated with the routing system, daily quota associated with the routing system, and/or otherwise based.

The datastores preferably include one or more queues, but can additionally or alternatively include sorted lists, hashed set, and/or any other suitable collection of digital assets. Digital assets stored in the queue(s) can be retrieved or enqueued by the routing controller API, by the routing system, and/or by any other suitable entity. The queues can include one or more: mail queues, orphan queues, fail queues, or any other suitable queue.

The datastore preferably includes a mail queue. The mail queue can store all digital assets and/or orders received in S100. The orphan queue can store digital assets and/or orders with no associated batch (e.g., no associated print partner) and/or any other suitable digital asset. The datastore can additionally include a fail queue. The fail queue can store digital assets that the routing system could not process (e.g., batch requirements were not satisfied, module requirements were not satisfied, etc.).

However, the datastore can be otherwise configured.

5. METHOD

The method for routing an asset to a print partner can include: receiving a digital asset S100, determining a set of print partners for the digital asset S200, optionally determining a set of candidate batches for the digital asset S300, optionally selecting a candidate batch of an associated print partner for the digital asset S400, optionally determining a candidate batch for an unmatched digital asset S5020, and routing the digital asset to the print partner S600. However, the method can optionally include: scheduling mail pickup from the print partner and/or any other suitable elements.

The method preferably functions enable on-demand printing at scale (e.g., by routing a digital asset of an order through one or more modules of the routing system to a print partner queue). The method can function to determine a print partner for a digital asset, wherein the print partner prints the digital asset and provides a physical version of the digital asset to a delivery service for delivery to an intended recipient.

The method preferably independently determines a print partner for each digital asset (e.g., within an order), but can alternatively determine a print partner for each order, a print partner for each mail set (e.g., sharing common mail permutation parameters), a print partner for an asset within an order (e.g., wherein the print partner can be assigned to the rest of the assets within the order), or for any other suitable set of assets.

In variants, one or more digital assets cooperatively forming an order are processed in aggregate. The digital assets can be assigned a print partner by filtering the set of all print partners using the routing system. As the routing system processes the digital asset at each module, the set of candidate partners can be continually reduced, until a final candidate print partner is determined and the digital asset is enqueued at the particular print partner queue.

The method is preferably performed by the system 20, but can additionally or alternatively be performed by any other suitable programmatic system.

5.1 Receiving a Digital Asset S100.

Receiving a digital asset S100 can function to receive and process a digital asset and/or an order for routing by the routing system. S100 is preferably performed concurrently with S200 (e.g., for digital assets of the same order, for digital assets of different orders, etc.), before S200, after S200, and/or at any other suitable time. One or more digital assets can be received by S100 from one or more senders: concurrently, serially, or in any suitable order.

In a first variation, the digital asset includes a complete digital proof (e.g., a .pdf, a .jpg, etc.; with all visual aspects merged into a unitary document).

In a second variation, the digital asset is specified by a set of variables, which can function to enable customization of each asset (e.g., by programmatically specifying the visual layout, visual graphics, and asset parameters for each asset). The variables are preferably HTML or JSON, but can be any other suitable data structure.

The variables can be automatically compiled to form a digital proof for each asset, but can be otherwise used. The variables can include: a custom image (and/or URL therefor), visual element location, border sizes, fonts, font sizes, text box locations, text content, merge variables, tags, base elements, head elements, meta elements, style elements, title elements, section elements (e.g., body elements, section elements), headers, footers, captions, and/or other variables. Examples of merge variables that can be used include: customer information (e.g., name, phone number, address, etc.); date; invoice line items; custom images; letter creation date; verification code; code expiration date; and/or other information.

In a specific example, each digital asset is specified using HTML variable values (e.g., as part of a template for a predetermined layout, mail size, mail format, etc.). The HTML can include the merge variables, conditional statements (e.g., customizing text based on a variable such as location, purchase history, etc.), loops, and/or any other suitable elements. In this specific example, S100 can include converting each HTML to a print ready PDF. The print ready PDFs and associated asset parameters can be the input to S200 and/or any other suitable element.

However, the digital asset can be otherwise specified.

S100 can include receiving a digital asset from a sender, from a service provider, from a digital asset generation system, from any other suitable system, from an API, and/or any other suitable entity. In variants, each digital asset and the associated asset parameters included in an order can be individually routed through the routing system. In alternative variants, an order can be routed through the routing system (e.g., the order is not split into the digital asset components).

S100 can include, after receiving an order, adding the order to the mail queue. In variants, when the order is next to be received by the routing system, the order can be split into each of the digital assets and associated asset parameters. The order can be split: based on the associated volume of the order, by default, or when any other condition is met.

However, the digital asset can be otherwise received.

5.2 Determining a Set of Print Partners for the Digital Asset S200.

Determining a set of print partners for the digital asset S200 can function to determine one or more print partners that can print the asset (e.g., based on print partner capabilities, print partner capacity, etc.). The set of print partners is preferably determined by the routing system, but can additionally or alternatively be determined by any other suitable system. The set of print partners can be determined based on a set of capabilities (e.g., asset parameter permutation) of each print partner, an available capacity (e.g. remaining capacity for the day, the week, the month, etc.), a daily minimum satisfaction (e.g., number of assets needed to satisfy a daily minimum), whether or not the print partner is operating that day, price data, and/or any other criteria. A set of print partners can be determined for each digital asset, for each order, for each batch (e.g., queue of mail having the same values for a parameter set), periodically (e.g., every minute, hourly, daily, monthly), on a schedule, and/or at any other suitable frequency. The set of print partners can be determined based on asset parameters (e.g., color, perforation, size, etc.), partner parameters (e.g., capability, capacity, geographic location, etc.), and/or any other suitable parameters. The asset parameters can be binary or categorical, but can alternatively be continuous parameters.

The set of print partners can be randomly selected (e.g., weighted, unweighted, etc.), determined based on capability (e.g., based on asset parameters), determined based on capacity (e.g., whether sending the print piece to a print partner will exceed their daily or monthly quota; a remaining capacity, such as a number, percentage, etc.; etc.), determined based on a minimum capacity (e.g., whether a print partner's minimum is satisfied per day, week, month, etc.), determined based on delivery date (e.g., whether the mail delivery date after the asset is printed will fall within the range specified by the user ordering the mail), a combination thereof, determined based on a set of rules (e.g., serial rule application), and/or otherwise determined. For example, a print partner can be selected if the print partner is capable of printing the asset, if the print partner has remaining capacity, and if the print partner's minimum capacity is not satisfied, and/or based on a difference between a print partner's minimum and the actual number of assets the print partner has printed.

The set of print partners can be determined by: filtering a candidate set of print partners; identifying print partners within the candidate set; selecting print partners from the candidate set; and/or the set of print partners can be otherwise determined. Determining the set of print partners can include determining a set of preferred partners, determining capable partners from the preferred partners, and/or determining any other set of print partners. The processes for determining the set of print partners can be performed individually (e.g., in series), in combination, and/or in any suitable order. When the processes are performed serially, print partner rules can be re-weighted, normalized, otherwise adjusted, or unadjusted.

Figure 3:
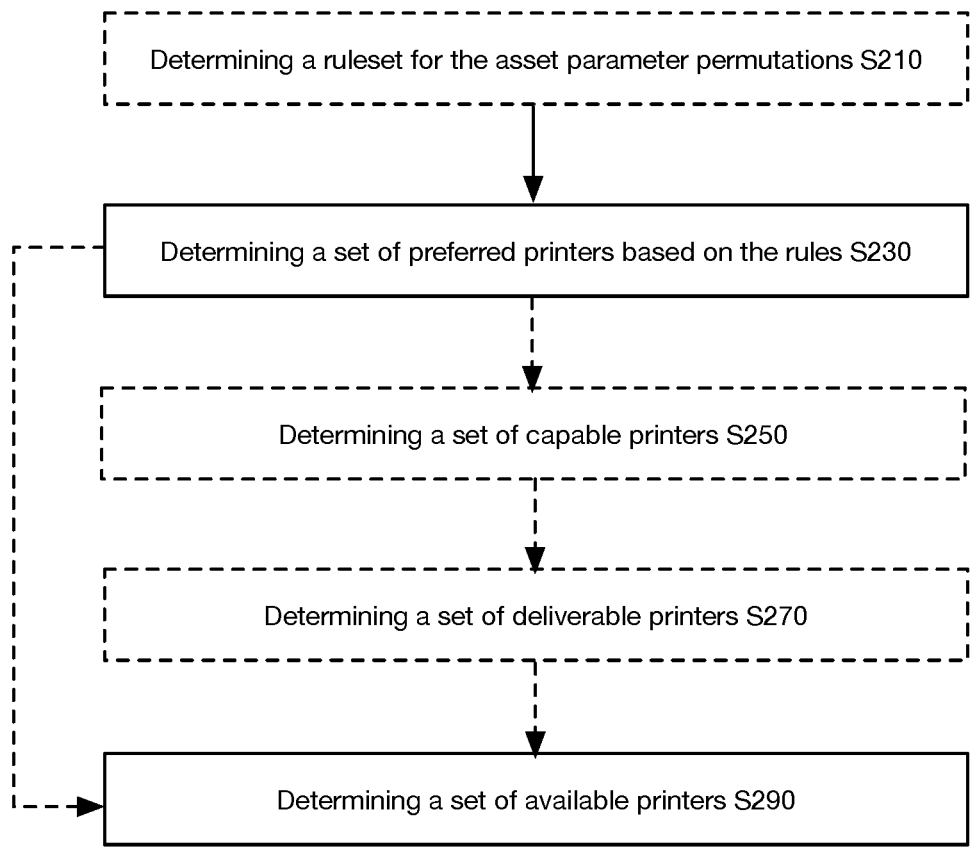
FIG. 3 is a schematic representation of a variant of determining the set of print partners for a digital asset.

Determining the set of print partners can include: optionally determining a ruleset for the asset parameter permutations S210; determining a set of preferred print partners based on the ruleset S230; optionally determining a set of capable print partners S250; optionally determining a set of deliverable print partners S270; determining a set of available print partners S290; and/or any other suitable elements (e.g., as shown in FIG. 3).

Determining a ruleset for the asset parameter permutations S210 can function to determine a rule for each asset parameter permutation. Each asset parameter permutation can be underspecified (e.g., only a subset of the asset parameters has specified values), but can alternatively specify values for each asset parameter. The asset parameter permutations can be determined based on print partner machine capabilities, common historical permutations, permutations with a volume of N or more assets, permutations with an asset frequency of X (e.g., 10/month, 100/month, 10/week, etc.) or more, and/or otherwise determined. Each asset parameter permutation is preferably associated with a rule, such that the asset parameter permutations and associated rules collectively form a ruleset. Additionally or alternatively, the asset parameter permutation can be associated with a batch, a print partner, and/or any other suitable data structure.

The ruleset can be determined by the rule module and/or any other suitable module. Each rule can be determined per asset parameter permutation, individually per print partner, and/or otherwise determined. Each rule can include a set of weights (e.g., values between 0-1, between 1-100%, etc.), but can be a decision tree, or otherwise constructed. Each weight can be associated with a print partner. The ruleset can be determined before S100 (e.g., the rules can be pre-generated), contemporaneously with S100, after S100, independently from S100, and/or at any other suitable time. The ruleset can be re-calculated periodically (e.g., every hour, every 2 hours, every half day, every day, every week, etc.), or not re-calculated. An example of a rule and a ruleset is depicted in FIG. 9.

In a first variant, the ruleset can be predetermined and retrieved from the datastore.

Figure 4:
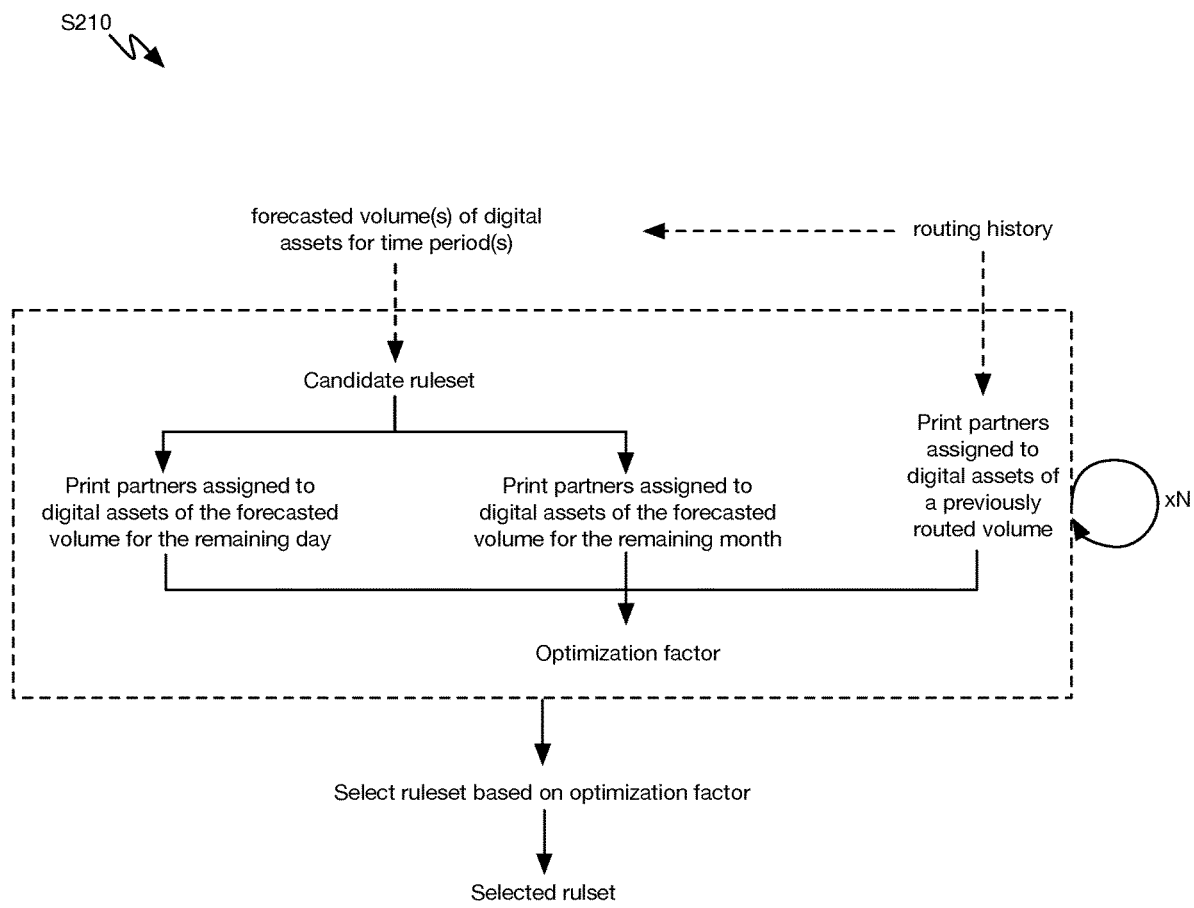
FIG. 4 is a schematic representation of a variant of rule generation.

In a second variant, the ruleset can be generated based on an optimization (e.g., as shown in FIG. 4). The optimization can be performed over a predetermined period (e.g., a day, a week, a month, etc.). The optimization can optimize for one or more optimization factors, which can include: print cost, time-to-print, time-to-delivery, and/or any other suitable factor. The print cost can be per digital asset of a particular asset parameter permutation, per batch of a particular asset parameter permutation, a fixed cost per digital asset, a fixed cost per batch, and/or any other suitable cost. The print cost can be calculated for each print partner (or a subset thereof). The print partner with the minimum print cost can be selected.

The optimization can include estimating future volume. The future volume can be forecasted per grouping of digital assets (e.g., by asset parameter permutation, by print partner capabilities, etc.), per user account, per region, and/or otherwise forecasted. The future volume can be forecasted for the rest-of-the-day, next day, N days out, remainder of week, next week, N weeks out, remainder of month, next month, N months out, and/or any other suitable timeframe. When the future volume is forecasted for multiple days, the historical data can be a multiple of a predetermined number of days (e.g., 4, 5, 6, 7, 8, 9, etc.). When the future volume is forecasted for the rest-of-the-day, the historical data is restricted to digital assets arriving between the current time and the following print cutoff time. The future volume is preferably a truncated mean of historical data (e.g., for the recurrent time period, for the geographic region, etc.), but can alternatively be a mean, median, or other measure of historical data. Alternatively, the future volume can be determined based on scheduled mailings, determined using a neural network, determined using a simulation, or otherwise determined. However, the future volume can be otherwise estimated. The future volume can be forecasted periodically (e.g., every hour, every day, every week, every month, every year, etc.), in response to a predetermined deviation of the actual volume from the forecasted volume, or upon satisfaction of any other suitable forecasting condition.

In a first embodiment, performing the optimization includes choosing a candidate ruleset including rules for each asset parameter permutation (e.g., with equally weighted print partners, randomly weighted print partners, etc.). Each rule can be a random rule, the rule from the previous iteration, rule that is currently in use, determined using derivative-free optimization, and/or otherwise determined.

The weights for each rule can be determined based on print partner capacities (e.g., daily capacity, weekly capacity, monthly capacity, remaining daily capacity, remaining weekly capacity, remaining monthly capacity, minimum daily capacity, minimum weekly capacity, minimum monthly capacity, maximum daily capacity, maximum weekly capacity, maximum monthly capacity, etc.), based on print partner cost (e.g., more expensive print partners can be assigned lower weights), and/or otherwise determined. In a first example, if a print partner's minimum monthly volume is not satisfied, the print partner can be assigned a higher weight (e.g., across all rules or a subset thereof, for a single rule, etc.). In a second example, if a print partner's maximum monthly volume is satisfied, then the print partner can be assigned small or no weight (e.g., weights across all rules or a subset thereof can be set to 0.1, 0.0, etc.).

Performing the optimization can include forecasting a remaining volume for the day (e.g., before the cutoff time for the day), forecasting the volume for the rest of the month, determining print partners for each asset of the remaining volume for the day using the candidate ruleset, determining print partners for the volume for the rest of the month using the candidate ruleset, calculating the optimization factor (e.g., for the remaining daily volume for each print partner, for the monthly volume for each print partner, for actual routed volume and associated print partners, etc.), and repeating the above process for a predetermined number of iterations (e.g., 100, 500, 1000, 2000, 10000, etc.), wherein each iteration generates a candidate ruleset and optimization factor pair, and wherein each iteration can be performed in series or in parallel.

The optimization factor is preferably a score. The score can be calculated based on the cost of printing each asset of the remaining volumes for the day and/or the month at the assigned print partner, but can additionally or alternatively be calculated based on the time to print each asset and/or a time to deliver each asset. However, the optimization factor can be a variable weight or be any other suitable factor.

The candidate ruleset can be generated by modifying previously generated rulesets (e.g., randomly, using derivative-free optimization, etc.), randomly generating the ruleset, manually generating the ruleset, and/or otherwise generated.

After generating the candidate ruleset and associated optimization factor for a predetermined number of iterations, performing the optimization can include selecting a ruleset from the candidate rulesets as the ruleset for the method. Selection can be based on the ruleset that minimizes the normality penalty of the following objective function:

$$\text{normality penalty} = (\text{print cost}) \times 0.1 \times \sum_{g}^{groups} \left(1 - \sum_{p}^{partners} \text{weight}_{p,g}\right)^2$$

wherein the groups refer to groups of digital assets (e.g., grouped by digital asset parameters, by print partners capability, etc.). Additionally or alternatively, selection can be based on the ruleset that minimizes the optimization factor, the ruleset that minimizes De Jong's function (e.g., wherein x is the optimization factor), axis parallel hyper-ellipsoid function (e.g., wherein x is the optimization factor), and/or any other suitable objective function.

Performing the optimization can optionally include applying the selected ruleset from above to a first volume for the rest of a timeframe (e.g., hour, day, week, month, etc.) and repeating the above process to determine a second ruleset for a second remaining volume for a timeframe (e.g., hour, day, week, month). For example, the selected ruleset can be applied to the remaining monthly volume and the process can be repeated to determine a second ruleset for the remaining volume for the day. However, the optimization can be otherwise performed.

The above process can be performed to determine the ruleset for all asset parameter permutations (or a subset thereof), determine a rule for each asset parameter permutation separately (e.g., in parallel or in series), and/or otherwise determine a rule for each asset parameter permutation.

In a second variant, the above process (e.g., for performing the optimization) can be performed by forecasting only the remaining volume for the month (e.g., not forecasting the remaining volume for the day), and performing the optimization as described above based on the forecast for the remaining monthly volume.

In a third variant, the ruleset can be manually determined. However, the ruleset can be otherwise determined.

Determining a set of preferred print partners based on the rule S230 can function to determine which print partners are preferred for printing a digital asset. The set of preferred print partners can be determined by the preferences module, and/or any other suitable module. The set of preferred partners is preferably determined after S210, but can additionally or alternatively be performed after S100, after or before S250, after or before S270, or at any other suitable time. The set of preferred print partners can be a prioritized list of print partners based on the rule (e.g., prioritized according to the per-partner weights specified by the rule), an unprioritized list, and/or any other suitable set.

In a first variant, the rule can be selected by comparing the asset parameters of the digital asset with the asset parameter permutations, and selecting the rule associated with the asset parameter values that substantially match the digital asset's parameter values. Additionally or alternatively, a rule can be selected by matching asset parameter permutations with the asset parameters. The print partners associated with the selected rule become the set of preferred print partners (e.g., the print partners that are associated with a nonzero rule). The rules can be evaluated individually, in clusters, in series in parallel, and/or otherwise evaluated to determine the rule for the digital asset.

In a second variant, after selecting the rule, the rule can be used to identify preferred print partners within the set of all print partners based on the print partners in the rule with nonzero weights.

In a third variant, after selecting the rule, the rule can be used to generate a new set of preferred print partners from the set of all print partners based on the print partners of the rule with nonzero weights.

However, the set of preferred print partners can be otherwise determined.

Determining a set of capable print partners S250 can function to determine which of the print partners are capable of printing the digital asset. The set of capable print partners can be determined by the capability module and/or any other suitable module. The set of capable print partners can be determined after S230, before S230, contemporaneously with S230, before or after S270, before or after S290, and/or performed at any other suitable time. The set of capable print partners can be determined based on the set of preferred print partners (e.g., from S230), based on a set of print partners with remaining capacity, based on all available print partners, and/or any other set of candidate print partners.

In a first variant, the set of capable print partners can be determined by filtering out (e.g., removing print partners) that are not capable of printing the digital asset (e.g., from an analysis set of print partners that can be the set of preferred print partners, the set of print partners with remaining capacity, all available print partners, etc.).

In a second variant, the set of capable print partners can be determined by identifying the capable print partners within an analysis set of print partners (e.g., the set of preferred print partners, the set of print partners with remaining capacity, all available print partners, etc.).

In a third variant, the set of capable print partners can be determined by generating a new set of the capable print partners from an analysis set of print partners (e.g., the set of preferred print partners, the set of print partners with remaining capacity, all available print partners, etc.).

However, the set of capable print partners can be otherwise determined.

Determining a set of deliverable print partners S270 can function to determine print partners that enable an asset to be delivered to a recipient at a predetermined time, such as within a predetermined timeframe (e.g., within the next month; on a specific date; within a specific time period; no more than N days after an order is received by the system; etc.). The set of deliverable print partners can be determined by the routing system, more specifically by the speed optimization module, and/or by any other suitable module. The set of deliverable print partners can be determined before or after S210, S230, S250, not performed, and/or performed at any other suitable time. The set of deliverable print partners can include: determining a target timeframe (from the order); determining a recipient geography (e.g., address, zip, region, etc.); calculating an estimated delivery time (e.g., time duration, estimated day, etc.) for each candidate print partner to the recipient geography; and identifying the print partners associated with an estimated delivery time within the target timeframe as deliverable print partners. However, the deliverable print partners can be otherwise determined.

In a first variant, calculating the estimated delivery time can include retrieving the delivery time for each print partner to the recipient geography.

In a second variant, calculating the estimated delivery time can include: determining a time to print for each candidate print partner (e.g., retrieved, such as using an API, calculated, lookup from historical data, determined from a contract, etc.); determining a time to delivery to the recipient address or region for each candidate print partner (e.g., retrieved, such as using an API, calculated, lookup from historical data, from a delivery service, such as a delivery service, etc.); and calculating an estimated delivery time from time to print and time to delivery.

The set of deliverable print partners can be determined by identifying print partners whose estimated delivery time falls within the target timeframe (or earlier). When the estimated delivery time is earlier than the target timeframe, the system can hold the digital asset until the estimated delivery time falls within the target timeframe.

However, the set of deliverable print partners can be otherwise determined.

Determining a set of available print partners S290 can function to determine which of the print partners have capacity to print the digital asset (e.g., remaining capacity, such as for the day, for the month, etc.; minimum volume, such as for the day, for the month, etc.; any other capacity). The set of deliverable print partners can be determined using the capacity module and/or any other suitable module. The set of available print partners can be determined after or before S210, S230, S250, S270, and/or at any other suitable time. The set of available print partners can be determined based on a capacity counter for each print partner (e.g., to determine a current capacity). Additionally or alternatively, the current capacity can be estimated and/or otherwise determined. Additionally or alternatively, the print partner capacity can be used to determine print partner weight (e.g., adjust the print partner weight assigned by the rule, etc.).

In a first variant, the current capacity of a print partner can be determined by decrementing a capacity counter for a timeframe (e.g., day, week, month, etc.). The capacity counter for a print partner can be set to a capacity limit (e.g., retrieved from the datastore, determined based on the contract and/or historical data, etc.), and after sending a digital asset to a print partner, the capacity counter can be decremented. When the capacity counter is equal to zero, the capacity for the print partner is set to zero for the remaining timeframe and reset at the start of the next timeframe.

In a second variant, the current capacity of a print partner can be determined by incrementing (e.g., after sending a digital asset to a print partner) a capacity counter for a timeframe (e.g., day, week, month, etc.). After the counter is equal to or above a capacity limit (e.g., retrieved from the datastore, determined based on the contract and/or historical data, etc.), the capacity for the print partner is set to zero for the remaining timeframe and reset at the start of the next timeframe.

The set of available print partners can be determined from an analysis set of print partners, which can be the set of capable print partners, the set of preferred print partners, the set of deliverable print partners, the set of all print partners, and/or any other suitable set of print partners.

In a first variant, the set of available print partners can be determined by filtering out (e.g., removing) print partners who do not have remaining capacity (e.g., current capacity is set to zero), whose minimum volume is satisfied (e.g., wherein the minimum volume can be retrieved from the datastore, determined based on the contract and/or historical data, etc.; and compared to the current capacity), and/or otherwise filtered.

In a second variant, the set of available print partners can be determined by identifying available print partners from the analysis set of print partners based on the current capacity, minimum volume satisfaction, and/or criteria.

In a third variant, the set of available print partners can be determined by generating a new set of available print partners from the analysis set of print partners based on the current capacity, minimum volume satisfaction, and/or any other criteria.

However, the set of available print partners can be otherwise determined.

After determining the set of print partners, the weights associated with the remaining print partners can be normalized or scaled (e.g., between 0-1, between 0%-100%), or not scaled.

However, the set of print partners for the digital asset can be otherwise determined.

5.3 Determining a Set of Candidate Batches for the Digital Asset S300.

The method can optionally include determining a set of candidate batches for the digital asset S300, which can function to determine one or more batches for a digital asset, wherein the one or more batches are preferably associated with respective print partners of the set of print partners (e.g., from S200). S300 can be performed by the batch module, the preference module, and/or by any other suitable module. S300 is preferably performed after S200, but can additionally or alternatively be performed concurrently with S200, before S200, and/or at any other suitable time. The set of candidate batches is preferably determined based on asset parameters matching asset parameter permutations associated with existing batches, capacity counters associated with existing batches, but can additionally or alternatively be based on any other suitable information.

The set of candidate batches can have associated weights and/or rankings determined by the rule module, or be not weighted. The associated weights can be determined based on the rule for the print partner determined in S200 (e.g., the batch can inherit the print partner rule). Optionally, the weights can be determined based on the routing system state (e.g., the stable state, high-volume state, etc.), can be manually determined, and/or otherwise determined.

A batch can be selected for the asset from the candidate batches: using S400 (discussed below), randomly, according to the candidate batch weights (e.g., in weight order, using weighted random selection, etc.), such as using random weighted selection, and/or otherwise selected.

In variants, S300 can include determining a new batch for the digital asset. Determining a new batch can include: selecting a print partner from the print partner set (e.g., randomly, based on each print partner rule, based on speed, based on cost, etc.) and initiating a new batch with the selected print partner, or otherwise determining a new batch for the digital asset. Determining a new batch can occur when there are no pre-existing batches that can fill the asset parameters, when there are no pre-existing batches (e.g., the start of a production day, and/or at any other suitable time), and/or at any other suitable time. Determining a new batch can be based on the routing system state, based on the print partner rules (e.g., stored in the datastore, from S200, etc.), based on the asset parameters, and/or be otherwise determined. Determining a new batch can include determining multiple batches that can additionally be associated with rules based on a priority of the batch. The priority can be determined by the batch module, the rule module, and/or any other suitable module. However, the new batch can additionally or alternatively be otherwise determined.

However, S300 can additionally or alternatively include any other suitable elements performed in any other suitable manner.

5.4 Selecting a Print Partner for the Digital Asset S400.

Selecting a print partner for the digital asset S400 can function determine a single print partner to send the digital asset to for printing, and optionally selecting a candidate batch associated with the selected print partner. S400 is preferably performed by the routing system, such as by the batch module, and/or any other suitable module. S400 is preferably performed after S300, contemporaneously with S300, and/or at any other suitable time. S400 can be performed when the yielded print partner set from S300 and/or S500 is not empty.

The digital asset can be assigned to a candidate print partner and optionally to a print partner batch. The digital asset can be sent to the assigned print partner. The digital asset can optionally be sent with a print partner batch identifier, identifying the batch that the digital asset should be printed in.

Assigning the digital asset to the candidate print partner can include: selecting the candidate print partner for the digital asset based on the rule determined in S200, or otherwise assigning the digital asset to the candidate print partner. The available capacity for the selected candidate print partner can optionally be decremented and/or incremented for the print period after: print partner assignment, digital asset transmission to the print partner, print partner confirmation of digital asset receipt, and/or at any other suitable time.

However, the digital asset can be unassigned to a print partner. In variants when the print partner is unassigned to a print partner, the digital asset can be sent to the orphan queue and/or the fail queue for re-routing by S500.

S400 can be based on capacities associated with each print partner (retrieved from the datastore). The capacities can be determined for each print partner (e.g., by querying the datastore for print partner counts/capacities for a current production period or future production period). Determining the capacities can be based on print partner weights (retrieved from the datastore), preference module, and/or be otherwise based. S400 can include allocating the digital asset to the (highest-weighted) print partner with capacity for the nearest production period, but can additionally or alternatively include allocating the digital asset to the print partner with the most capacity (but below a threshold volume and/or target volume), and/or to a print partner with any suitable capacity.

In a first variant, the print partner can be selected using the rule (e.g., by performing weighted random sampling).

In second variant, the print partner can be selected using a probabilistic method, such as weighted random selection, to determine the candidate print partner from the set of print partners from S200. The determination can be based on respective print partner weights associated with the rule for the asset parameter permutation. For example, if a partner A has 0.75 weight and partner B has 0.25 weight, then partner A is chosen 75% of the time and partner B is chosen 25% of the time.

In a third variant, selecting the print partner for the digital asset can include estimating when the asset will be printed. The print time estimate can be determined based on an expected print time received from the print partner, based on historical print times associated with the print partner, and/or otherwise determined. The estimation can be performed by the print estimation module and/or otherwise determined.

However, the print partner can be otherwise determined.

5.5 Determining a Print Partner for an Unmatched Digital Asset S500.

Optionally, the method can include determining a print partner for an unmatched asset S500. This can be used when the digital asset is not previously matched with a print partner, and can function to assign the digital asset to a print partner. S500 is preferably performed after S400, but can additionally or alternatively be performed after any other suitable element (e.g., after a yielded set of print partners by a routing system module is empty).

The digital asset can be enqueued in the orphan queue (e.g., stored in the datastore) by the routing controller API.

In variants, if a digital asset of an order is enqueued in the orphan queue, the remaining digital assets of the order can be re-routed to the orphan queue by the routing controller API, the batch module, the capacity module, and/or by any other suitable component the system.

In variants, S500 can include modifying the rule that yielded the empty set of print partners. Modifying the rule can be based on the asset parameters, based on print partner parameters, and/or otherwise based. After modifying the rule, routing the digital asset(s) to the mail queue in S100 and/or to S200. S500 can alternatively be performed without modifying the rule.

In variants, when the routing controller API routes the digital asset(s) to the mail queue, the digital asset(s) can be associated with a priority relative to other digital asset(s), and/or orders in the queue (e.g., added to the front of the queue, middle of the queue, and/or at any suitable position in the queue).

However, the print partner can be otherwise determined.

5.6 Routing the Digital Asset to the Print Partner S600.

Routing the digital asset to the print partner S600 can function to send the digital asset to the print partner and can optionally include sending a selected batch identifier.

In a first variant, the digital asset is routed as soon as a print partner is selected.

In a second variant, the digital asset can be stored in the datastore and the print partner can periodically query the datastore for digital assets assigned to the print partner.

In a third variant, the digital asset can be added to a print partner batch (e.g., stored in the datastore) and when the batch reaches a certain size and/or after a period of time from batch creation (e.g., 10 min, 1 hour, etc.), the batch can be sent to the print partner for printing.

In a fourth variant, routing the digital asset to the print partner can include estimating when the digital asset will be picked-up by the delivery service and/or estimating when the delivery service will deliver the asset to the recipient. The estimations can be performed by the print estimation module and/or otherwise determined.

However, the digital asset can be otherwise routed to the print partner.

6. ILLUSTRATIVE EXAMPLES

Figure 5:
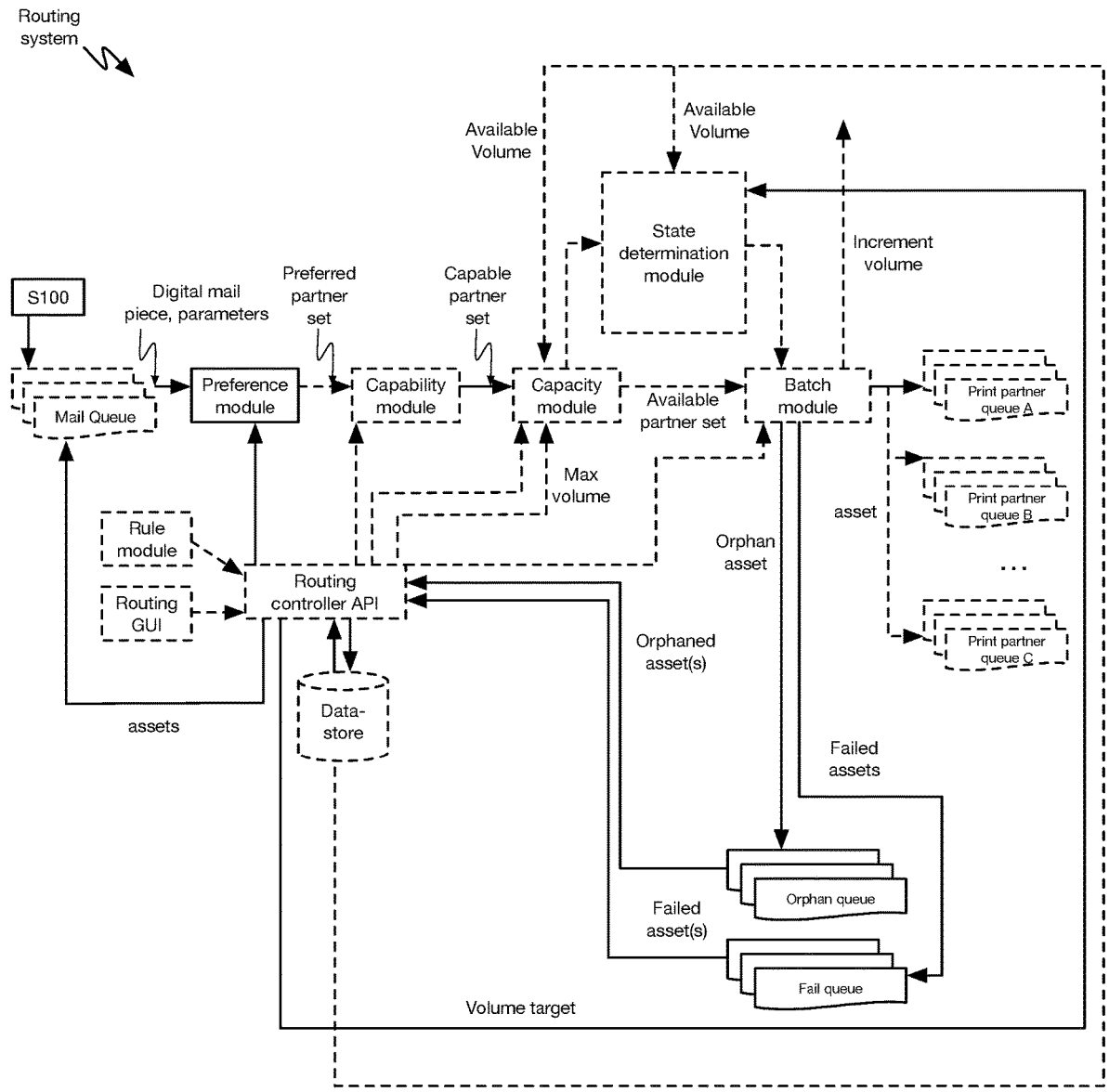
FIG. 5 is a variant of the system and method.

In a first example (e.g., as shown in FIG. 5), a received digital asset (e.g., of an order) can be enqueued in a mail queue. The routing controller API can dequeue a digital asset of the order and associated asset parameters, dequeue the order, and/or dequeue any other suitable element as described in S100. The routing controller API can route the digital asset and associated asset parameters to the preference module. The preference module can determine a preferred partner set based on a set of pre-generated rules. The preferred partner set can be received, in addition to the asset parameters, by the capability module. The capability module can determine the capable partner set based on: the asset parameters and the print partners' capability (e.g., asset parameter permutations), and/or any other suitable information. The capable partner set can be received, in addition to the asset parameters, by the capacity module. The capacity module can determine an available partner set based on: the capable partner set; a maximum volume (e.g., for each print partner, for each pre-existing batch, etc.); a minimum volume (e.g., for each print partner, for each pre-existing batch, etc.); an available volume (e.g., for each print partner, for a delivery service, for a batch, etc.); and/or based on any other suitable information. The available partner set can be received, in addition to the digital asset and the asset parameters, by the preference module. The preference module can determine a preferred partner set based on the available partner set and rules determined by the rule module. The batch module can determine a batch partner set, a selected print partner, a selected batch at a print partner, and/or determine any other information. The batch module can use the rule associated with the asset parameter permutation to select the print partner (e.g., using weighted random sampling). The batch module can select a batch associated with a print partner based on batch size (e.g., selecting the batch that is below a batch volume threshold) and based on the asset parameter permutation. The batch module can enqueue the digital asset at a selected partner queue. After digital asset enqueuing or print partner selection, the system can increment the volume counter for the selected print partner in the datastore, and additionally increment and/or decrement the available volume/capacity associated with the selected print partner.

Figure 6:
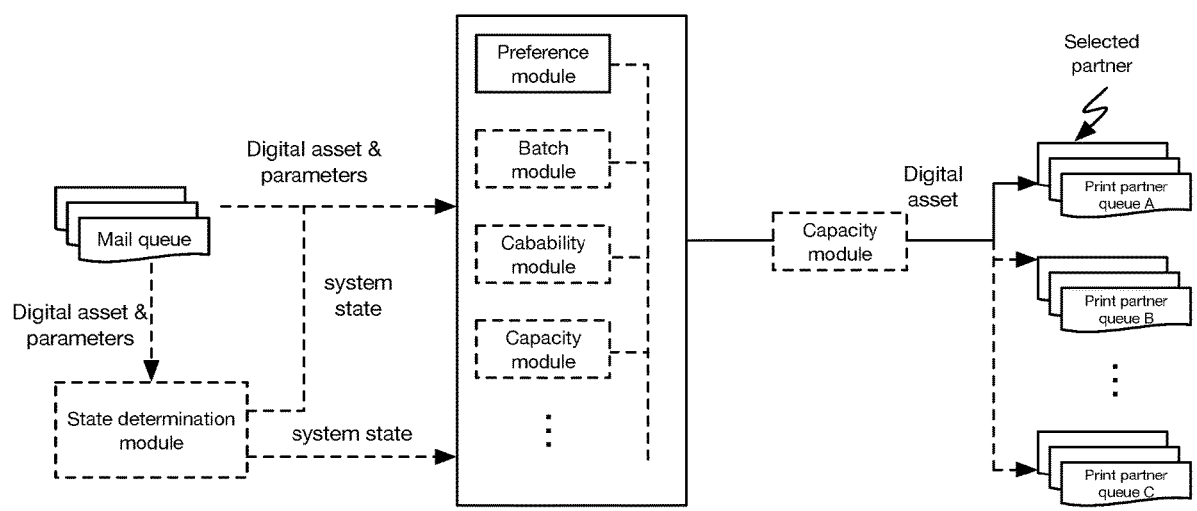
FIG. 6 is a variant of the system and method.
Figure 7:
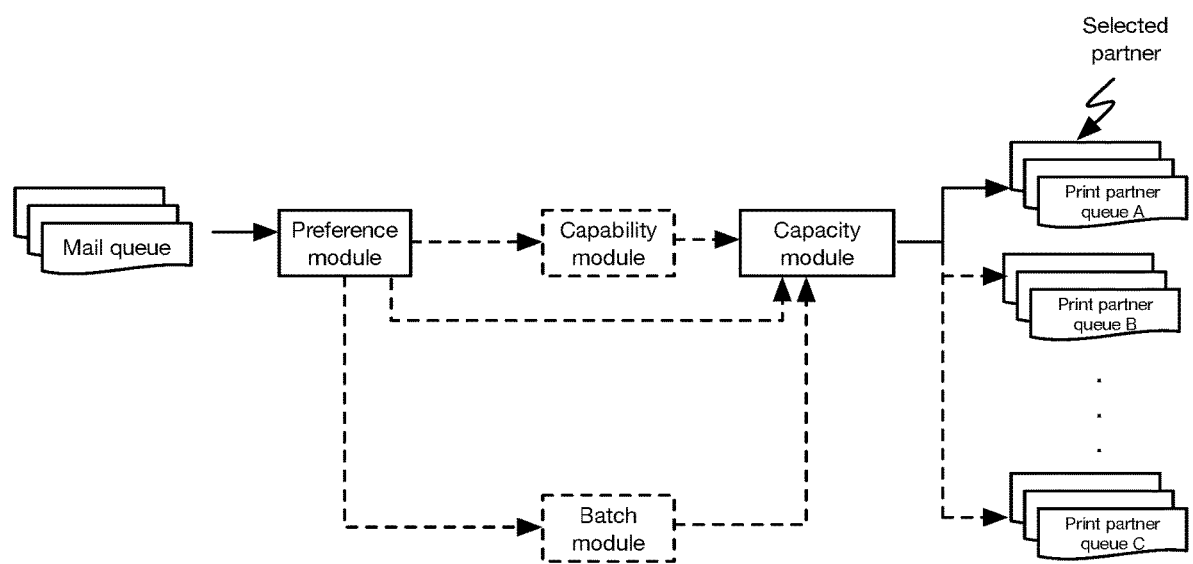
FIG. 7 is a variant of the system.

Variants of the above described method are depicted in FIGS. 6 and 7.

In a second example (e.g., as shown in FIG. 6), the digital asset received at any of the preference module, batch module, state determination module, capability module, capacity module, and or any other suitable module can be received in parallel or in series. One or more of the modules can be used to select a print partner and optionally a batch for the digital asset. The routing controller API can route the digital asset to the selected print partner (e.g., print partner queue).

In a third example (e.g., as shown in FIG. 7), the preference module can receive the digital asset from the mail queue and determining preferred partner set. The capability and/or batch module can optionally determine a capable partner set and/or a batch partner set respectively (e.g., in series or in parallel, or not determine the partner set). The system can optionally determine if a batch exists that can fill the digital asset (e.g., yes or no). If a batch exists, the digital asset can be processed by the batch module to determine a batch partner set based on the capable partner set, the preferred partner set, and or any other suitable set of print partners and/or other suitable information or data. The capacity module can select a print partner based on the batch partner set, the preferred partner set, the capable partner set, and/or any other suitable partner set (or combination of sets). If a batch does not exist, the digital asset can be processed by the capacity module, directly, to select a print partner based on the capable partner set, the preferred partner set, and/or any other suitable set of print partners.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for routing an asset to a print partner, comprising:
   receiving the asset, wherein the asset is associated with asset parameters;
   determining a ruleset, wherein each rule within the ruleset is associated with an asset parameter permutation, wherein a rule comprises a weight for each print partner, and wherein an asset parameter permutation comprises a specified value for at least one asset parameter, wherein the ruleset comprises a first and second rule cluster;
   determining a set of preferred print partners by evaluating the rules in the first rule cluster in parallel and evaluating the rules in the second rule cluster in series;
   determining a set of available print partners from the set of preferred print partners based on a capacity of each print partner of the set of preferred print partners;
   selecting the print partner from the set of available print partners; and
   routing the asset to the print partner for printing.

2. The method of claim 1, wherein the asset comprises a digital mail piece.

3. The method of claim 1, wherein the asset is received as part of an order, wherein the order comprises a plurality of assets, wherein each asset within the order is individually routed using the method.

4. The method of claim 1, wherein the ruleset is determined based on a set of optimization factors.

5. The method of claim 4, wherein the set of optimization factors comprises at least one of print cost, time-to print, or time-to-delivery.

6. The method of claim 1, wherein the ruleset is associated with an asset parameter permutation matching the asset parameters.

7. The method of claim 1, wherein the set of preferred print partners are determined based on a routing system state.

8. The method of claim 1, wherein the print partner is selected based on a daily minimum asset volume associated with the print partner.

9. The method of claim 1, wherein the asset is specified by a set of HTML variable values.

10. The method of claim 1, further comprising storing the asset in a datastore, wherein the datastore is queried by the print partner for the asset.

\* \* \* \* \*